United States Patent
Fai et al.

(10) Patent No.: US 7,784,396 B2
(45) Date of Patent: Aug. 31, 2010

(54) HYDRAULIC SEALING ASSEMBLY FOR A BEVERAGE MACHINE BREWING HEAD

(75) Inventors: Yuen Kin Fai, Tai Po (HK); Marcel Hendrikus Simon Weijers, Hoogeveen (NL)

(73) Assignee: Electrical and Electronics Limited, Tai Po, N.T. (HK)

( * ) Notice: Subject to any disclaimer, the term of this patent is extended or adjusted under 35 U.S.C. 154(b) by 838 days.

(21) Appl. No.: 11/507,162

(22) Filed: Aug. 21, 2006

(65) Prior Publication Data

US 2008/0041232 A1 Feb. 21, 2008

(51) Int. Cl.
*A47J 31/00* (2006.01)
(52) U.S. Cl. .......................... 99/295; 99/287; 99/302 R
(58) Field of Classification Search .................. 99/295, 99/302 R, 302 P, 297, 287
See application file for complete search history.

(56) References Cited

U.S. PATENT DOCUMENTS

| | | | |
|---|---|---|---|
| 4,323,173 A | 4/1982 | Shannon | |
| 4,389,925 A * | 6/1983 | Piana | 99/289 R |
| 4,583,450 A | 4/1986 | Rost et al. | |
| 4,796,521 A * | 1/1989 | Grossi | 99/287 |
| 5,280,747 A | 1/1994 | Bonneville et al. | |
| 5,434,392 A | 7/1995 | Belinkiff | |
| 5,740,719 A | 4/1998 | Triola et al. | |
| 6,253,664 B1 | 7/2001 | Gianelli | |
| 6,431,056 B1 | 8/2002 | Fritschi | |
| 7,032,503 B2 * | 4/2006 | Cai | 99/286 |
| 7,461,585 B2 * | 12/2008 | Nenov et al. | 99/282 |
| 7,503,254 B2 * | 3/2009 | Noordhuis | 99/295 |
| 7,506,577 B2 * | 3/2009 | Maver | 99/289 R |
| 2005/0103202 A1 * | 5/2005 | Rahn et al. | 99/279 |

* cited by examiner

*Primary Examiner*—Reginald L Alexander
(74) *Attorney, Agent, or Firm*—George A. Herbster

(57) ABSTRACT

This invention uses a hydraulic system to seal the brew chamber of a coffee maker. The sealing mechanism consists of a heating part, sealing part and slider drawer. The heating part provides the hot water and forms a chamber that allows the piston seal to expand for sealing. The slide drawer is the region where the coffee is extracted and the crema is created. The claimed invention differs from that previously known in the art in that it does not employ a mechanical locking system but rather a hydraulic system for locking. This results in a tighter and more secure lock fit of the brew chamber than previously has been known in the art. In addition, because a hydraulic system for locking is used, locking of the brew chamber is accomplished without manual force.

14 Claims, 6 Drawing Sheets

HYDRAULIC SEALING ASSEMBLY FOR A BEVERAGE MACHINE BREWING HEAD

FIELD OF THE INVENTION

The present invention relates to the design of a hydraulic sealing assembly for the brewing head unit of a beverage machine.

BACKGROUND OF THE INVENTION

Throughout this application, various references are referred to. Disclosures of these publications in their entireties are hereby incorporated by reference into this application to more fully describe the state of the art to which this invention pertains.

This invention relates to an apparatus for preparing a beverage fit for consumption, such as coffee, tea, chocolate and cappuccino. The sealing locking mechanism used by most existing beverage machines, seal the coffee chamber by mechanical means only. For example, in current beverage machines, coffee is placed on a stainless steel or aluminum filter cup which consists of three bayonet type fittings. The brew head's side has a counter recess which fits to the cup. The user turns a handle on the filter cup to lock in the bayonet fitting to the brew head. A silicone seal ring is fixed on the brew head. Once the filter cup is locked into the brew head, the seal ring seals the top edge of the filter cup to prevent water leaking from it. Another example of this apparatus is the single serve pod coffee machine. In this design, the locking mechanism is a slider or turning ring which locks on the brew chamber bottom. The slider or turning ring has tabs and corresponding recesses on the support base. This seal ring, which has minor expanding capability, is fixed on the brew head. Both locking mechanisms described use a mechanical method to seal the filter cup/pod holder to the seal ring.

The drawback of this design is that the silicone sealing ring has very limited expanding capability. As such, when the pump pressure increases greater than the sealing force, the brew head and seal ring rise, but the filter cup and pod holder do not. As a result leaking results from the gap formed between the seal ring and the filter cup/pod holder.

The claimed invention solves this problem because sealing occurs by hydraulic means and not by mechanical locking. The claimed invention uses an expandable seal mounted on the boiler. When water is pumped to the boiler, the piston seal expands sealing the piston to the pod holder. The greater the pressure created by the pump, the greater the back pressure exerted against the pod and, in consequence, stronger is seal between the piston and pod holder.

The foregoing objects and advantages of the present invention are illustrative of those that can be achieved by the present invention and are not intended to be exhaustive or limiting of the possible advantages which can be realized. Thus these and other objects and advantages of the invention will be apparent from the description herein or can be learned from practicing the invention, both as embodied herein or as modified in view of any variation which may be apparent to those skilled in the art. Accordingly, the present invention resides in the novel methods, arrangements, combinations and improvements herein shown and described.

SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow those of ordinary skill in the art to make and use the invention concepts will follow.

This invention relates to an apparatus for preparing a beverage fit for consumption, such as coffee, tea, chocolate and cappuccino. The invention solves the sealing problem on the pressurized coffee chamber as it exists currently. Existing beverage machines, utilize a locking mechanism comprising a bayonet type fitting or a wedge affixed to a slider or turning ring which mate with corresponding recesses on the coffee holder. These locking mechanisms are manually employed. The claimed design does not utilize such a locking mechanism, and thereby eliminates the need for manual force.

The claimed invention provides an expandable seal whose shape is round and accordion-like. The expandable seal is mounted on the boiler. When the boiler is full of the water and the pump is activated, the seal expands sealing the pod holder. The greater the pump pressure, the stronger the seal created between the boiler and pod holder. Sealing is properly achieved at that pressure where the boiler system internal pressure creates such expansion of the boiler seal ring so that the boiler seal ring comes in contact and mates with the rim of the pod holder.

This invention comprises a hydraulic sealing assembly for a coffee maker consisting of: a boiler assembly, a sealing assembly, and slide drawer assembly, operatively linked to sustain pressure up to a sufficient pressure to create a sealing surface between the rim of the pod holder and the boiler seal ring. Sealing is achieved by operation of the boiler's system pressure which creates a local stress on the surface of the boiler seal ring great enough to withstand the internal fluid pressure of the boiler. Accordingly, the boiler system pressure is sufficient where such boiler pressure is capable of deforming the boiler seal ring so as to make such boiler seal ring make surface contact with the rim of the pod holder. As such, in one embodiment system boiler pressure may be a minimum of 0.5 bar. In another embodiment system boiler pressure may be a maximum of 150 bar.

The boiler assembly is the chamber for heating water. The main section of the sealing assembly is the hydraulic locking assembly. The sealing assembly is mounted on a metal support bracket by locking washers and screws. The drawer assembly, located under the sealing assembly, is the container for the pod holder. It is here that the coffee extraction and crema is made. A sub-assembly of the piston valve is fixed with the connector. This piston valve sub-assembly controls the flow of water supplied to the brew chamber. The piston valve is normally closed. Upon pump activation, water is fed to the boiler. Because the piston valve is closed, pressure builds up in the boiler, forcing the seal to expand. The pressure build up continues until the piston valve releases in either one of two ways.

First, brewing hot water is done without the coffee pod. In this situation, after the pod holder is sealed, the pump pressure continues to increase. The piston valve assembly is provided with an overpressure release valve. When the boiler internal pressure or pump pressure exceeds 0.5 bar, the overpressure relief valve opens.

Second, brewing hot water occurs with the coffee pod. In this situation, after the pod holder is sealed, the piston valve assembly is lowered as the pump pressure is increased. As a result, the water plate rises up against the coffee pod, inducing the piston valve to rise until the valve opens.

DETAILED DESCRIPTION OF THE FIGURES

The invention relates to a brew head of a coffee maker having an automatic sealing assembly powered by a hydraulic system. FIG. 1 to FIG. 6 illustrate a non-limitative embodiment of the invention.

DETAILED DESCRIPTION OF THE INVENTION

Figure 1:
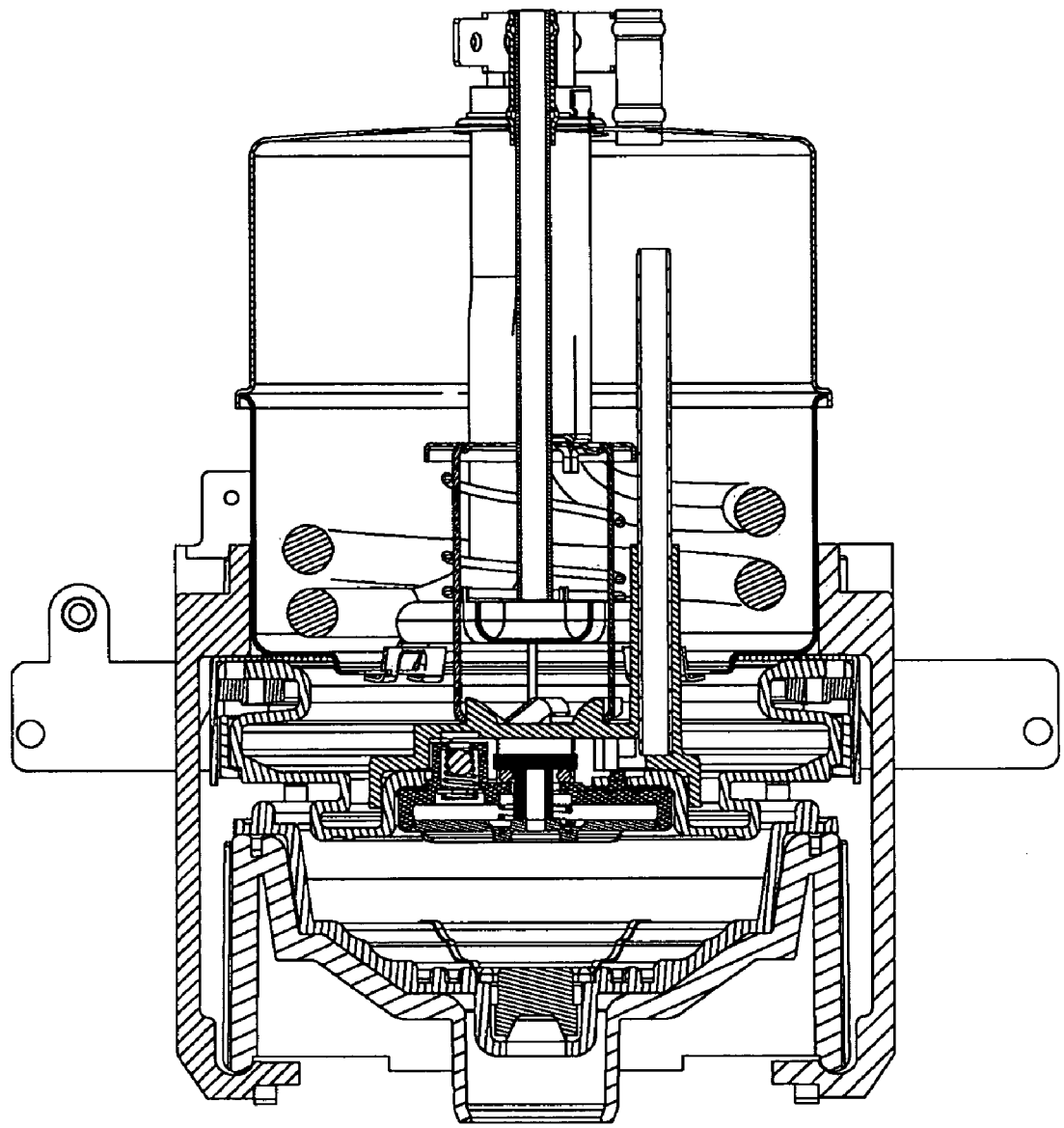
FIG. 1 is a cross sectional view of the hydraulic locking assembly of the present invention.

The invention relates to a brew chamber of a coffee maker having a sealing assembly which is automatically sealed by a hydraulic system.

As used herein the hydraulic system consists of the hydraulic sealing assembly and all its supportive sub-assemblies as described herein below.

This invention provides a hydraulic sealing assembly of a coffee maker comprising: a boiler assembly, a sealing assembly, and slide drawer assembly operatively linked to sustain a sufficient pressure to create a sealing surface between the rim of the pod holder and the boiler piston seal ring. Sealing is achieved by operation of the boiler's system pressure which creates a local stress on the surface of the boiler seal ring great enough to withstand the internal fluid pressure of the boiler. Accordingly, the boiler system pressure is sufficient where such boiler pressure is capable of deforming the boiler seal ring so as to make such boiler seal ring make surface contact with the rim of the pod holder. As such, in one embodiment system boiler pressure may be a minimum of 0.5 bar. In another embodiment system boiler pressure may be a maximum of 150 bar.

The boiler assembly comprises a boiler top part 4, a boiler mid part, a boiler low part 6, a heater element 5, an inlet tube 1, an outlet tube 2, a cold water tube 3 and a metal support bracket 7. The boiler assembly is provided with a heating chamber for heating water. The base of the boiler assembly is open so as to embrace the sealing assembly which is mounted on the metal support bracket at the base of the boiler assembly.

The sealing assembly comprises a hot water tube 3, spring support washer 8, cone spring 9, wire loop 11, cone low metal 12, piston seal 14, closing washer, piston seal cover, piston valve, O-ring, piston spring, piston, silicone ball, ball valve spring, spring bracket and water plate. The sealing assembly is mounted on the metal support bracket to seal the base of the boiler. The accordion-liked shaped piston seal allows for expansion in the vertical direction.

The drawer assembly consists of fixed clamps, a pod holder, a silicone nozzle and a pod holder sub-drawer. Fixed clamps are mounted on the metal support bracket and form a cabinet for the pod holder sub-drawer.

This intent of the present design is to use the water in the boiler to seal the pod holder. This design differs from the current state of the art in that it utilizes a hydraulic locking system. There is no lever, handle or any other mechanical part whereby the user manually locks the brew chamber.

Figure 2:
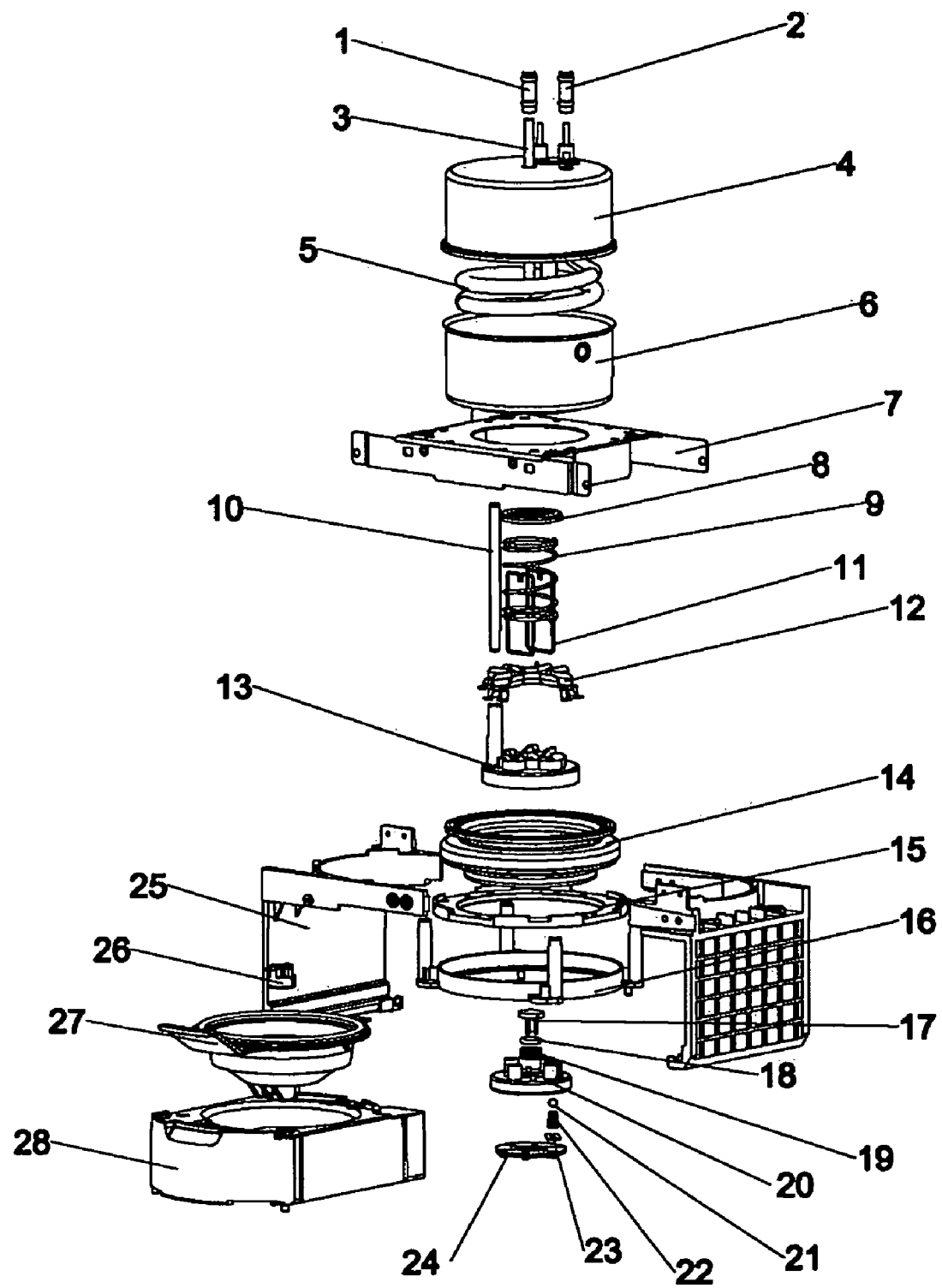
FIG. 2 is an exploded view of the hydraulic assembly of the present invention.

The present design is applicable to existing pod coffee makers. As shown in FIG. 2, the user first puts the pod in the pod holder 27. The pod holder 27 is fixed with a silicone nozzle 26 in its center. The user then places the pod holder to the pod holder sub-drawer 28 and slides it into the fixed clamp 25. The fixed clamp 25 are mounted on the metal support bracket to form a cabinet for the holder sub-drawer 28.

Figure 3:
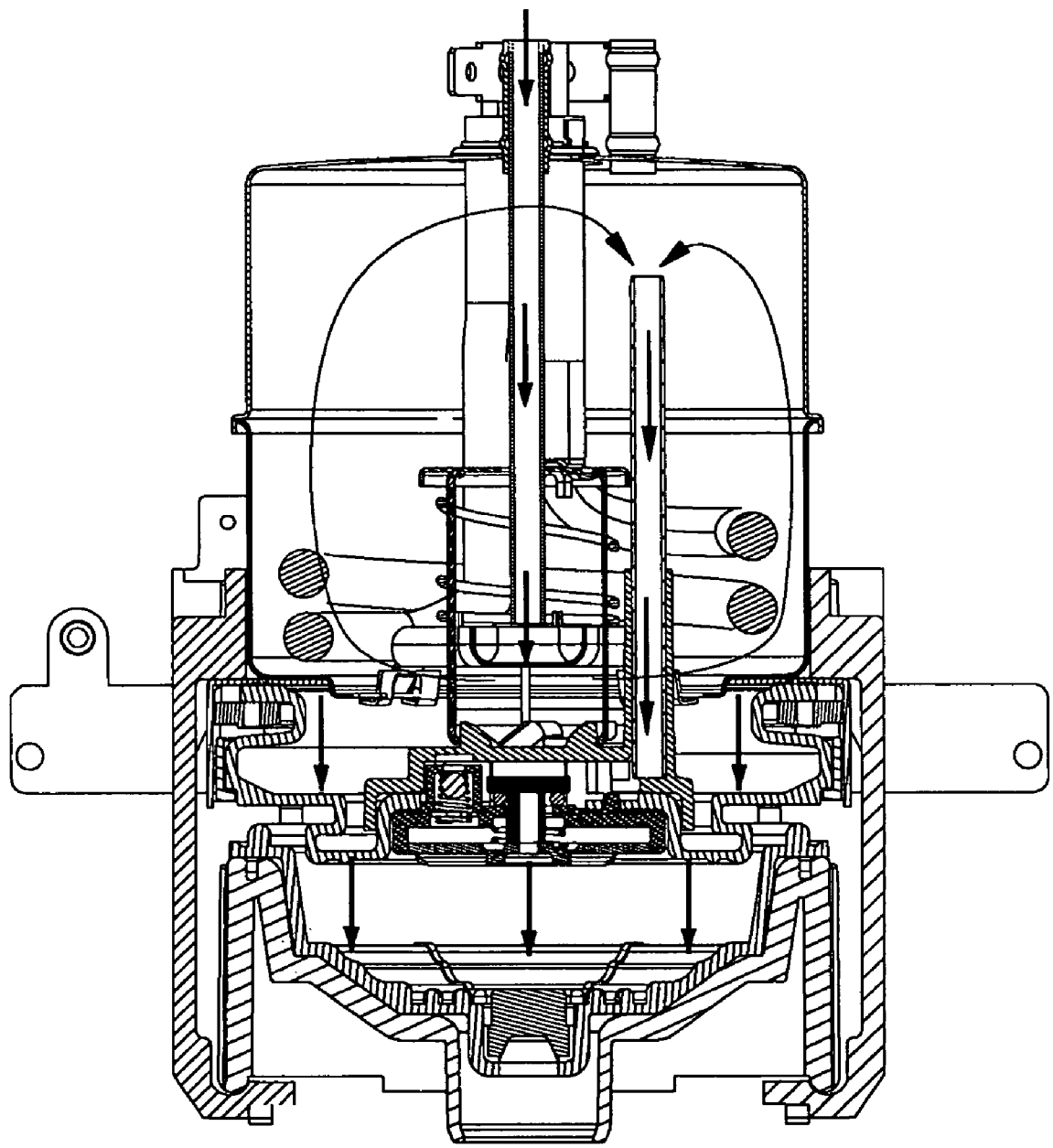
FIG. 3 is a cross-sectional view of the hydraulic locking assembly of the present invention depicting the flow of water forcing the piston seal to expand downward.
Figure 4:
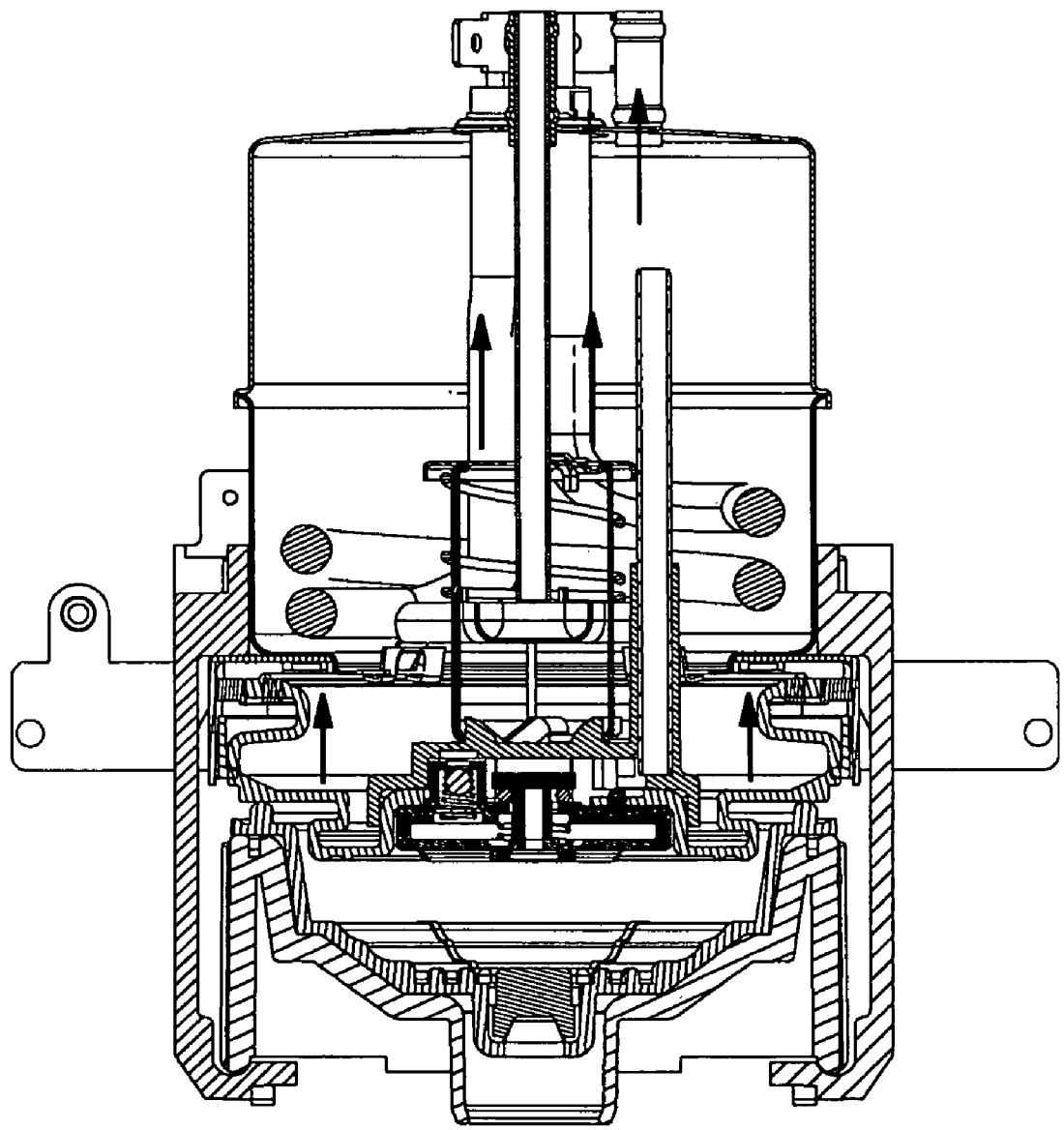
FIG. 4 is a cross sectional view depicting the withdrawn direction of the connector and the direction of flow of the excess water through the outlet tube as the hydraulic lock is released.
Figure 5:
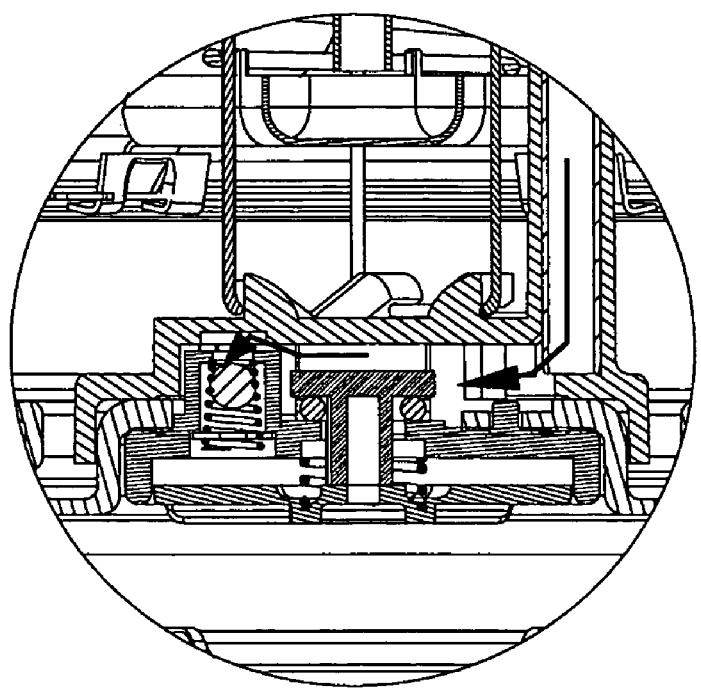
FIG. 5 is an enlarged cross sectional view of the piston valve assembly without a pod as it opens on high pressure showing hot water flow from the hot tube to the overpressure release valve with the ball valve pressed down and released.
Figure 6:
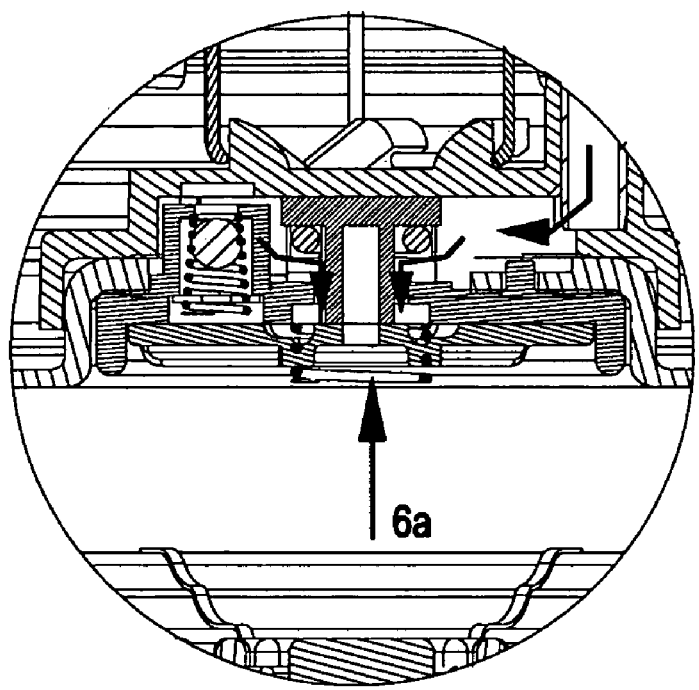
FIG. 6 is an enlarged cross sectional view of the piston valve assembly with pod as it opens under high pressure with arrow 6a depicting the piston valve with O ring as it is raised up by the pod.
Figure 7:
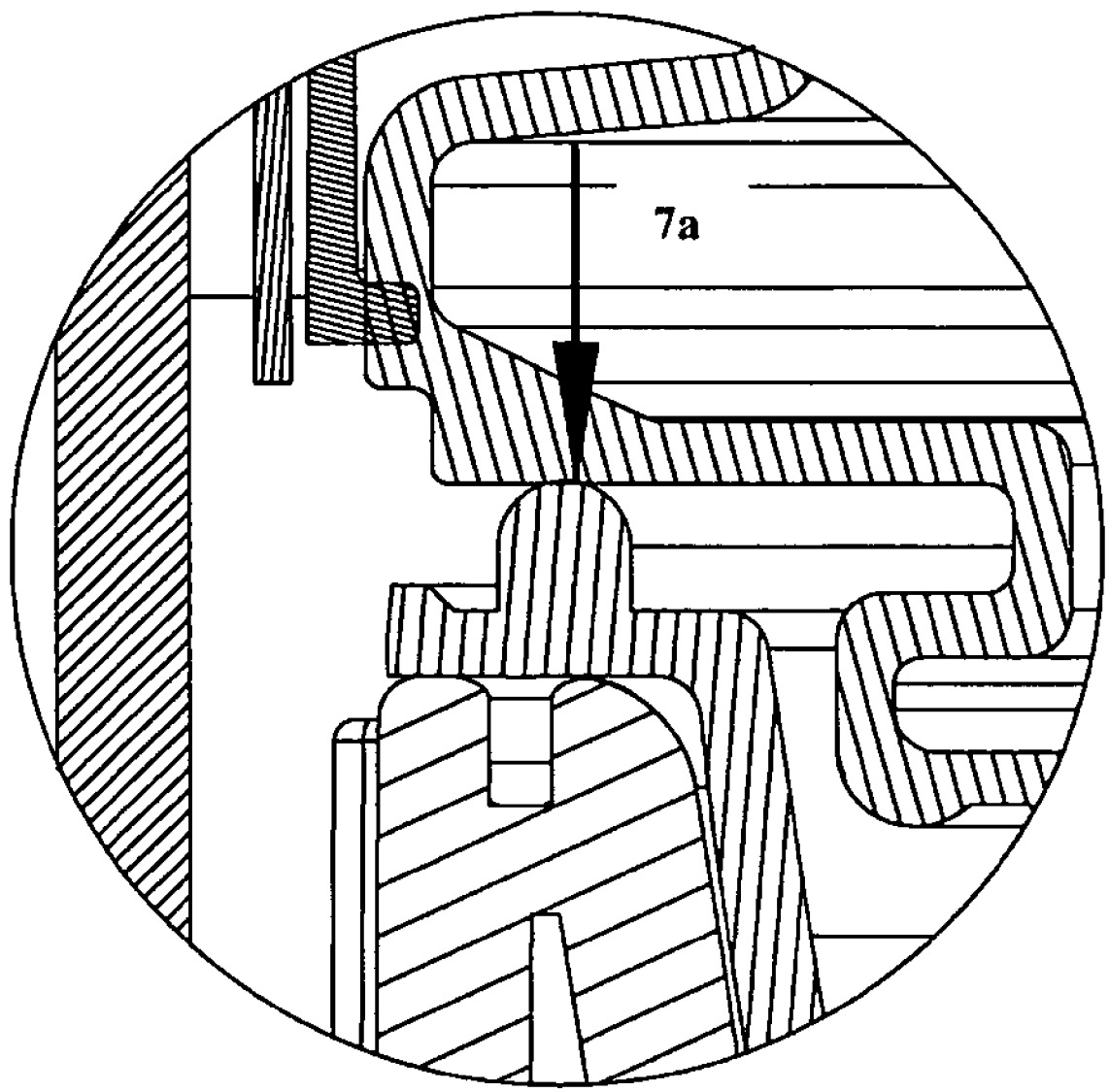
FIG. 7 is an enlarged cross sectional view of the pod holder rim as it contacts the piston seal ring upon sealing with arrow 7a depicting the downward local stress imposed by sealing.

Second, the user then simply presses a button for brewing. In doing so, the pump is activated and water is pumped from the water tank to the boiler. FIG. 3 shows the flow path of water. Pumped water flows to the boiler from inlet tube 1 and is pumped to cold tube 3. A piston seal 14, with piston valve sub-assembly, is mounted on the base of the boiler assembly, so as to make the boiler its own closed system. The pumped water increases the internal pressure of the boiler assembly because the piston valve sub-assembly blocks the pumped water from flowing out. The piston seal 14, as such, is the only expandable outlet. Increasing pressure, forces the piston seal 14 downward until it embraces the pod holder edge and seals it. The greater the internal pressure in the boiler, the greater is the force exerted by the piston seal 14 in sealing the pod holder.

The piston valve 17, piston spring 19, O-ring 18, piston 20, silicone ball 21, ball valve spring 22, spring bracket 23, water plate 24 are mounted together by screws to form the piston valve sub-assembly. The piston valve sub-assembly is mounted with the connector 13 by screws to form a closed system of the sealing assembly. The piston valve sub-assembly controls the water flow from the boiler to the pod holder 27, when hot water is brewed without the pod in the pod holder 27, the piston valve sub-assembly is initially closed. If the pump pressure continuously increases in the boiler to approximately 0.5 bars, the silicone ball 21 is pressed down and releases the hot water. After the pump stops, the ball valve spring 22 returns to its normal position to ensure proper sealing.

When hot water is brewed with a pod in the pod holder 27, the piston seal 14 and piston valve subassembly is lowered down to seal the pod holder. In doing so, the water plate 24 embraces the top of the pod. The piston valve sub-assembly is connected to the piston seal 14 by connector 13.

A spring support washer 8, cone spring 9, wire loop 11 and cone low metal 12, hot water tube 10 are mounted on connector 13 which then mounts with the piston seal 14 to the boiler low region 6. This combination keeps the connector 13 and cone spring 9 moving in the vertical direction. The hot water tube 10 delivers hot water to the piston valve 5 sub-assembly. As the piston valve sub-assembly is lowered, the pod pushes up piston 20 and prevents further movement of the water plate 24. The piston 20 with O-ring 19 moves up opening the seal and thus allowing hot water to flow into the pod holder.

After brewing, the pump stops and the cone spring 9, connector 11, and piston seal 14 return back to their normal positions. Any excess water flows out of the boiler from outlet tube 2. The rise of piston valve 17, causes pod holder 27 to be un-sealed/unlocked. In the unlocked/unsealed position, the user needs only slide out the holder sub-drawer 28 and take out the pod holder 27.

This invention provides a coffee maker wherein the brewing chamber seals itself upon pressurization. In an embodiment this pressurization is achieved by a hydraulic locking assembly.

In a separate embodiment, the hydraulic locking assembly comprises an expandable seal. In a further embodiment this expandable seal is made of silicone material. Finally, this invention provides the above coffee maker wherein the brewing chamber is accessible for placement or replacement of a pod without the need for manual force in an unpressurized condition.

Although the present invention has been described in detail with particular reference to preferred embodiments, thereof, it should be understood that the invention is capable of other different embodiments, and its details are capable of modifications in various obvious aspects. As is readily apparent to those skilled in the art, variations and modifications can be affected while remaining within the spirit and scope of the invention. Accordingly, the foregoing disclosure, description, and figures are for illustrative purposes only, and do not in any way limit the invention which is defined only by the claims.

What is claimed is:

1. A brewing head for a beverage brewing system comprising:
   A) pod holder means for receiving a beverage pod, the pod holder means including a sealing surface,
   B) support means for supporting the pod holder means with a beverage pod in a first fixed position,
   C) an open bottom boiler unit fixed in to the support means at a second position for receiving water under pressure,
   D) a piston valve sub-assembly adapted for motion relative to the boiler unit and the pod holder means, and
   E) an expandable seal having one end attached to the boiler unit adjacent the open bottom, the other end being attached to the piston valve sub-assembly and a intermediate portion thereof overlying the pod holder means sealing surface whereby as the pressure of the water in the boiler unit and in contact with the interior of the expandable seal increases an exterior portion of the expandable seal forms a seal with the pod holder means sealing surface.

2. A brewing head as recited in claim 1 wherein the expandable seal forms a seal at a first pressure of water in the boiler unit and the piston valve sub-assembly includes a first pressure responsive valve that is activated to direct heated water under pressure to the pod holder means.

3. A brewing head as recited in claim 2 wherein the brewing head includes a water plate that distributes the water over the pod.

4. A brewing head as recited in claim 3 wherein the piston valve sub-assembly includes a second pressure responsive valve that is activated in the absence of a pod in the pod holder means.

5. A brewing head as recited in claim 4 wherein the piston valve sub-assembly includes means for opening the first pressure responsive valve to allow the passage of water when the pod holder means contains a pod and is in the first position.

6. A brewing head as recited in claim 1 wherein the pod holder means includes a circular pod holder that receives the pod and includes a nozzle for dispensing a brewed beverage.

7. A brewing head as recited in claim 6 wherein the pod holder means includes a pod holder and a drawer for receiving the pod holder and the support means includes clamps for positioning the drawer relative to the piston valve assembly.

8. A brewing head as recited in claim 1 wherein the boiler unit includes means for defining a boiler region, an electrical heating coil in the boiler region and an inlet that admits liquid under pressure into the boiler region.

9. A brewing head as recited in claim 1 wherein the piston valve sub-assembly additionally includes a connector attached thereto and means for biasing the water plate and valve away from the pod holder means.

10. A brewing head as recited in claim 9 wherein the biasing means includes a cone and wire loop that attached to the support means.

11. A brewing head as recited in claim 1 wherein the piston valve assembly includes a hot water tube, spring support washer, cone spring, wire loop, cone low metal, piston seal, closing washer, piston seal cover, piston valve, O-ring, piston sprint, piston, silicone ball, ball valve spring, spring bracket and water plate.

12. A brewing head as recited in claim 1 wherein the boiler unit includes an inlet tube, an outlet tube, a boiler top, a heater element, a cold water tube and a shaft support.

13. A brewing head as recited in claim 1 wherein the seal has an accordion-like cross section.

14. A brewing head as recited in claim 1 wherein the seal is formed of a silicone material.

* * * * *